United States Patent
Zerumsky et al.

(10) Patent No.: US 12,452,774 B2
(45) Date of Patent: Oct. 21, 2025

(54) METHOD AND APPARATUS FOR SSID AND WIRELESS COMMUNICATION MANAGEMENT

(71) Applicant: Comcast Cable Communications, LLC, Philadelphia, PA (US)

(72) Inventors: Daniel Zerumsky, Elkins Park, PA (US); Brian Flicker, Springfield, PA (US); Ruifeng Zhang, Havertown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 232 days.

(21) Appl. No.: 16/897,127

(22) Filed: Jun. 9, 2020

(65) Prior Publication Data

US 2021/0385733 A1    Dec. 9, 2021

(51) Int. Cl.
*H04W 48/16* (2009.01)
*H04W 8/26* (2009.01)
*H04W 28/02* (2009.01)
*H04W 48/14* (2009.01)
*H04W 88/08* (2009.01)
*H04W 84/12* (2009.01)

(52) U.S. Cl.
CPC .............. *H04W 48/16* (2013.01); *H04W 8/26* (2013.01); *H04W 28/0289* (2013.01); *H04W 48/14* (2013.01); *H04W 88/08* (2013.01); *H04W 84/12* (2013.01)

(58) Field of Classification Search
CPC ....... H04W 48/14; H04W 48/16; H04W 8/26; H04W 28/0289; H04W 84/12; H04W 88/08
See application file for complete search history.

(56) References Cited

U.S. PATENT DOCUMENTS

| | | |
|---|---|---|
| 7,333,460 B2 | 2/2008 | Vaeisaenen et al. |
| 8,072,952 B2 | 12/2011 | Aragon et al. |
| 9,456,397 B2 | 9/2016 | Forssell et al. |

(Continued)

FOREIGN PATENT DOCUMENTS

CN    1947379 A    4/2007

OTHER PUBLICATIONS

Capacity Planner, Revolution Wi-Fi, Wi-Fi SSID Overhead Calculator, http://www.revolutionwifi.net/capacity-planner.webpage accessed Jul. 23, 2020.

*Primary Examiner* — Wayne H Cai
(74) *Attorney, Agent, or Firm* — BakerHostetler (57) ABSTRACT

Methods and systems are described for managing SSIDs in a wireless network. An AP providing wireless communications may determine that there is high or low network traffic associated with one of its SSIDs. For example, a high or low number of computing devices may be probing the AP on a particular SSID. The AP may enable or disable the SSID on additional channels, increase or decrease its beacon interval, and/or increase or decrease its beacon physical layer (PHY) data rate in order to provide probing computing devices with greater or less access to the SSID based on the network activity. The AP may scan its channels for network activity and determine the appropriate changes to its SSIDs in order to improve access to heavily used SSIDs or to free up resources.

20 Claims, 9 Drawing Sheets

(56) References Cited

U.S. PATENT DOCUMENTS

| | | |
|---|---|---|
| 2005/0094607 A1 | 5/2005 | Zaki et al. |
| 2009/0240998 A1 | 9/2009 | Nikkila et al. |
| 2014/0064128 A1* | 3/2014 | Park .................. H04W 48/12 370/252 |
| 2015/0189547 A1* | 7/2015 | Forssell ............... H04W 48/06 370/235 |
| 2015/0373672 A1 | 12/2015 | Forssell |
| 2016/0044465 A1 | 2/2016 | Kevin |
| 2017/0048805 A1* | 2/2017 | Davey ............... H04W 52/241 |
| 2018/0359764 A1* | 12/2018 | Ong ..................... H04W 72/10 |
| 2020/0217875 A1* | 7/2020 | Li ......................... H04L 63/10 |
| 2021/0235235 A1* | 7/2021 | Goldenstein ........... H04W 4/14 |

\* cited by examiner

METHOD AND APPARATUS FOR SSID AND WIRELESS COMMUNICATION MANAGEMENT

BACKGROUND

Most access points (APs) advertising wireless network capabilities have more than one service set identifier (SSID) per radio. Every SSID that is used consumes extra network overhead and increases network latency, which may lead to increased network congestion. With the increasing deployment of various wireless networks such as mesh networking, APs are advertising larger numbers of SSIDs. These APs may also be communicating on a same wireless channel or resource as another AP. More efficient methods for wireless communications are desired.

SUMMARY

Methods and systems are described for managing SSIDs in a wireless network. An AP providing wireless communications may determine that there is high or low network traffic associated with one of its SSIDs. For example, a high or low number of computing devices may be probing the AP on a particular SSID. If an SSID with high network traffic is a high priority network, the AP may enable the SSID on additional channels, decrease its beacon interval, and/or decrease its beacon physical layer (PHY) data rate in order to provide probing computing devices with greater access to the SSID. Similarly, if an SSID with low network traffic is a low priority network, the AP may disable the SSID, increase its beacon interval, and/or increase its beacon physical layer (PHY) data rate in order to provide probing computing devices with less access to the SSID and free up network resources. The AP may scan its channels for network activity and determine the appropriate changes to its SSIDs.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Systems and methods are described herein for wireless communications. The techniques described herein may apply to managing identifiers for wireless networks. An identifier for a wireless network may comprise an SSID. SSIDs may be used throughout this description, but one skilled in the art would understand that the techniques described herein may be applicable to any type of identifier or indicator of a network or communication channel.

SSIDs may be used in the discovery of Wi-Fi networks as well as for time synchronization. SSIDs advertise the capabilities of a Wi-Fi network. Most APs have more than one SSID per radio. For every SSID that is used, extra network overhead is consumed, and latency is increased. SSID examples include but are not limited to a private home network, hotspot access (SP access), a corporate virtual local area network (VLAN), a guest network, or a mesh backhaul network. SSIDs that are unused waste available bandwidth. The techniques disclosed herein avoid issues stemming from multiple SSID beacons being broadcast in the same location.

A device (e.g., network device, wireless communications, device, AP, etc.) may determine that a network associated with a particular SSID is congested. The congestion may be caused, for example, by a large number of computing devices probing the SSID. The device may then determine one or more configuration changes associated with the SSIDs. The configuration changes may enable/disable certain SSIDs, change to the beacon intervals associated with certain SSIDs, and/or a change to the beacon physical layer (PHY) data rates associated with certain SSIDs. This technique enables the device to reduce the network congestion by causing a particular SSID to have increased/decreased availability and/or range relative to the other SSIDs of the device. This technique may also enable the device to prioritize certain networks over others based on the changes to their SSIDs and beacon intervals.

Figure 1:
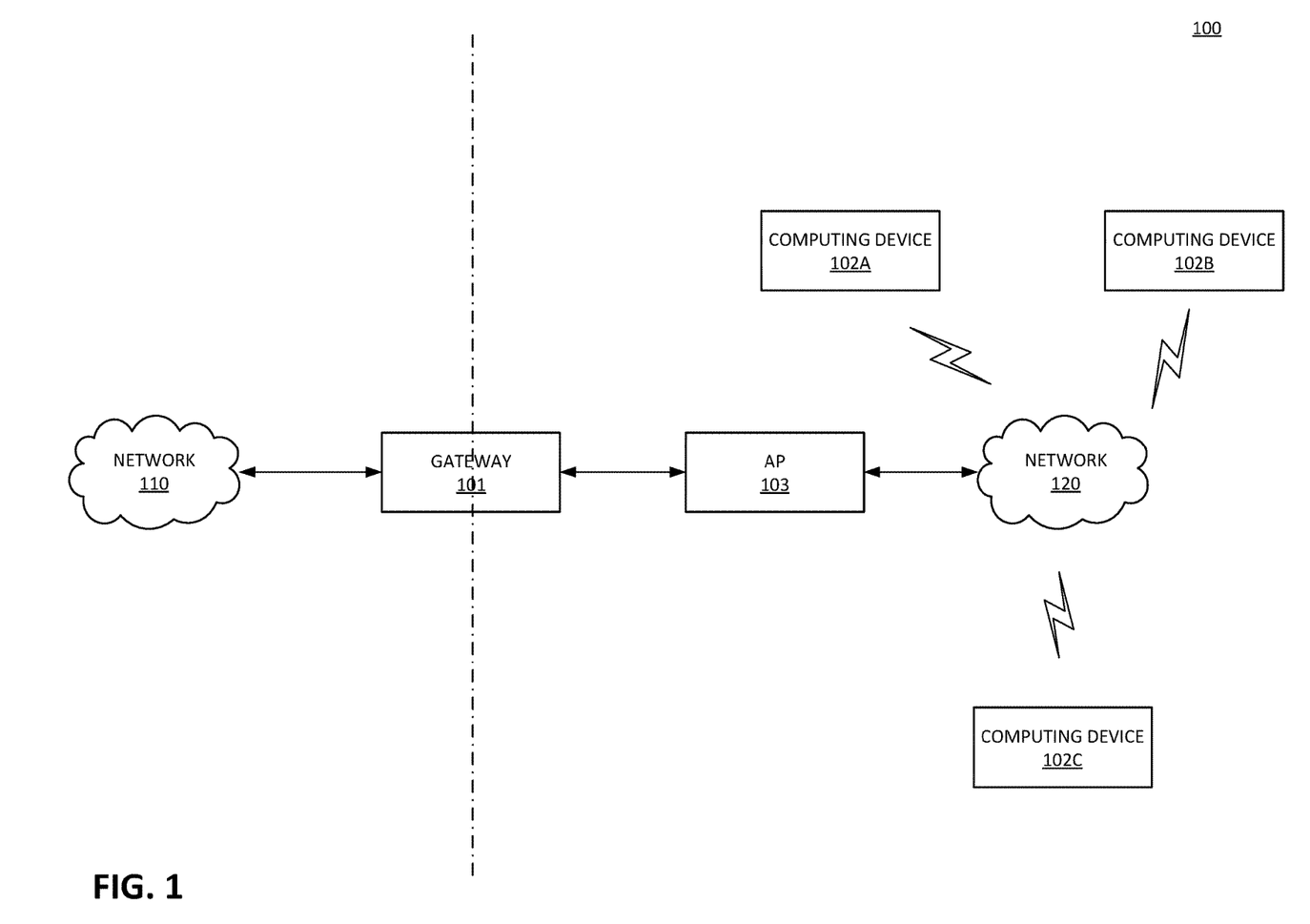
FIG. 1 shows an example system.

FIG. 1 shows an example system 100. The system 100 may comprise a gateway 101. The gateway 101 may send signals via a network 110. The network 110 may comprise a network such as the Internet or any other network described herein. The gateway 101 may operate as a wireless local area network (WLAN) router and cable modem. An AP 103 may communicate with the gateway 101 to provide Wi-Fi communications via network 120. The gateway 101 and AP 103 may be part of the same device and are depicted separately in FIG. 1 as an example. The AP 103 may comprise one or more radios each comprising transmitters, receivers, and/or transceivers for communicating via the network 120. The network 120 may comprise a Wi-Fi network. The network 120 may communicate using technologies such as WLAN technology based on the Institute of Electrical and Electronics Engineers (IEEE) 802.11 standards or any other appropriate technologies.

The computing devices 102a, 102b, and 102c may comprise transmitters, receivers, and/or transceivers for communicating via the network 120. The AP 103 may send signals, to computing devices 102a, 102b, and 102c, via the network 120. The AP 103 may receive signals, from the computing devices 102a, 102b, and 102c, via the network 120. The computing devices 102a, 102b, and 102c may comprise, for example, smartphones, tablets, laptop computers, handheld computers, desktop computers, or any other computing devices capable of operating in the network 120.

The one or more radios of the AP 103 may each be associated with more than one SSID. The AP 103 may advertise the SSIDs to advertise Wi-Fi network capabilities. Each SSID may be associated with a VLAN. The SSIDs may be advertised on one or more channels. For example, the SSIDs may be advertised on a 2.4 GHz channel or a 5 GHz channel. The AP 103 may determine network data associated with its SSIDs. The network data may indicate congestion in the network 120 or may indicate how many computing devices of computing devices 102a, 102b, and 102c are probing the SSIDs of the AP 103. The AP may then, based on one or more criteria and the network data, determine one or more configuration changes associated with the SSIDs.

The configuration changes may comprise a change in state (e.g., enabled or disabled) of one or more of the SSIDs, a change to a beacon interval to one or more of the SSIDs, and/or a change to a beacon PHY data rate. This technique enables the AP to reduce congestion in network 120 by causing a particular SSID to have increased/decreased availability and/or range relative to the other SSIDs of the AP 103.

The one or more criteria may comprise congestion in network 120 such as the amount of channel utilization or a number of computing devices of computing devices 102a, 102b, and 102c probing a particular SSID. The network 120 may be associated with a plurality of network types. The one or more criteria may comprise the network type associated with network 120. The network types may comprise, for example, a private network (e.g., a home network or enterprise network), a private network with guest access (e.g., a home or enterprise guest network), a chargeable public network (e.g., a hotspot network with fees), a free public network (e.g., a hotspot network without fees), low priority networks for management or features service, a home security network, or a backhaul traffic network (e.g., a mesh/bridging network). The one or more criteria may comprise Wi-Fi standards operating in the network 120. A Wi-Fi standard may be indicative of the network 120 comprising a high performing network (e.g. a robust network) such as an 802.11ax or 802.11ac network. The Wi-Fi standard may be indicative of a low performing network (e.g. a legacy network) such as an 802.11n, 802.11g, 802.11b, 802.11a network.

The following configuration changes can take effect based on the one or more criteria and the network data: beacon interval ranges may be adjusted, beacon PHY data rates may be adjusted, or the state of one or more SSIDs may be changed. The changes may be sent in a message to the computing devices 102a, 102b, and 102c to indicate the changes in SSID state, beacon interval, or beacon PHY data rates. The message may comprise an 802.11 action frame. The computing devices 102a, 102b, and 102c may send messages to the AP 103 when their PHY rate increases/decreases or when their retry rate is increasing/decreasing.

The AP 103 may change an SSID configuration based on information that takes into account congestion of network 120 or load (e.g., channel utilization). For example, the AP 103 may determine that a large a number of computing devices 102a, 102b, and 102c are probing one of the SSIDs or using only one of the SSID. The adjusted beacon intervals may reduce congestion in network 120 by reducing the number of beacon transmissions on the network 120. The adjusted beacon intervals may also ensure connection reliability. Alternatively or additionally, the AP 103 may adjust the state of the SSIDs. The AP 103 may, for example, disable an SSID that is not being used. The AP 103 may dynamically decrease a beacon interval for an SSID during high congestion to ensure connection reliability. During times of low traffic, the beacon interval may be decreased, which saves airtime and frees network resources.

The AP 103 may change an SSID configuration based on security and network efficiency. The AP 103 may dynamically increase a beacon PHY date rate when the computing devices 102a, 102b, and 102c are within good received signal strength indicator (RSSI) ranges. The AP 103 may decrease the beacon interval rate and beacon PHY rate when the computing devices 102a, 102b, and 102c are in poor RSSI and disconnects/retries are detected. As a result, beacons may be slower but computing devices 102a, 102b, and 102c located a farther distance from the AP 103 or computing devices 102a, 102b, and 102c with lower capabilities may still be in range of beacons.

The AP 103 may change an SSID configuration based on network prioritization. The AP 103 may increase a beacon interval and increase a beacon PHY data rate for SSIDs that are not being used. As a result, unused SSIDs may be less available and have a limited range while not being used. Lower priority SSIDs may be disabled. Alternatively or additionally, the AP 103 may detect usage on high priority SSIDs such as a home security network. The AP 103 may then decrease the beacon interval of the home security network to increase its availability to computing devices 102a, 102b, and 102c. The AP 103 may also decrease the beacon PHY data rate to give home security network improved range.

Figure 2:
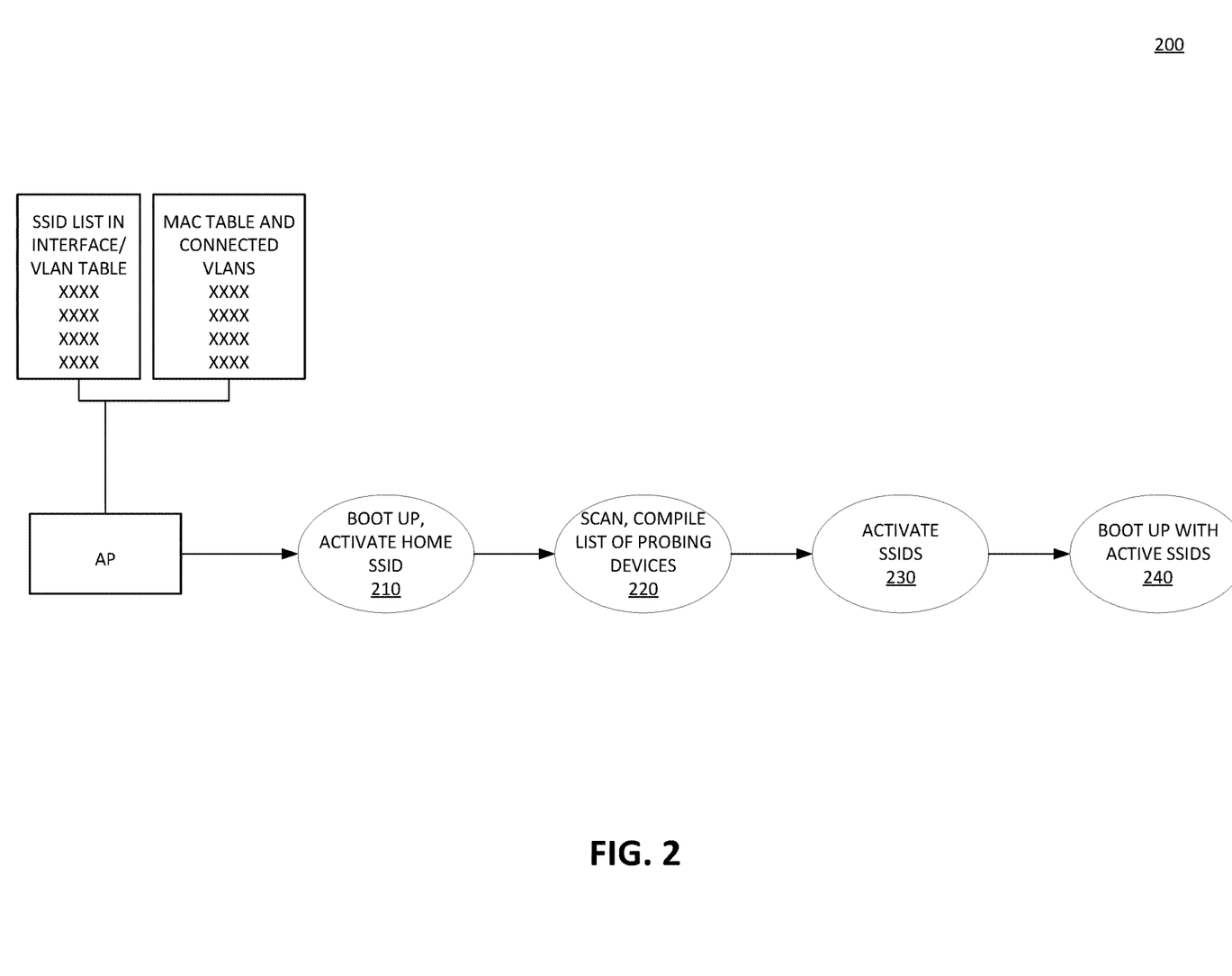
FIG. 2 shows an example method.

FIG. 2 shows an example method 200. The example of FIG. 2 is directed to a pre-boot, SSID initialization procedure that may be performed by, for example, the AP 103 (or gateway 101 if part of the same device) as depicted in FIG. 1. In the example of FIG. 2, an AP may store information comprising an SSID list. The SSID list may be stored in an interface or VLAN table. The AP may also store information comprising a list of medium access control (MAC) addresses. The MAC addresses may be stored in a MAC table. The AP may boot up and activate a default SSID(s), which for example may comprise a home network SSID (step 210). The AP may then scan for active computing devices probing for an SSID (step 220). As part of the scanning, the AP may check for devices in the MAC table associated to interface connected to an SSID and compile a list of probing computing devices. The scanning may comprise off-channel scanning during a configurable interval. The AP may then activate SSIDs based on the list of probing computing devices (step 230). The AP may then complete the boot up procedure with the active SSIDs (step 240).

Figure 3:
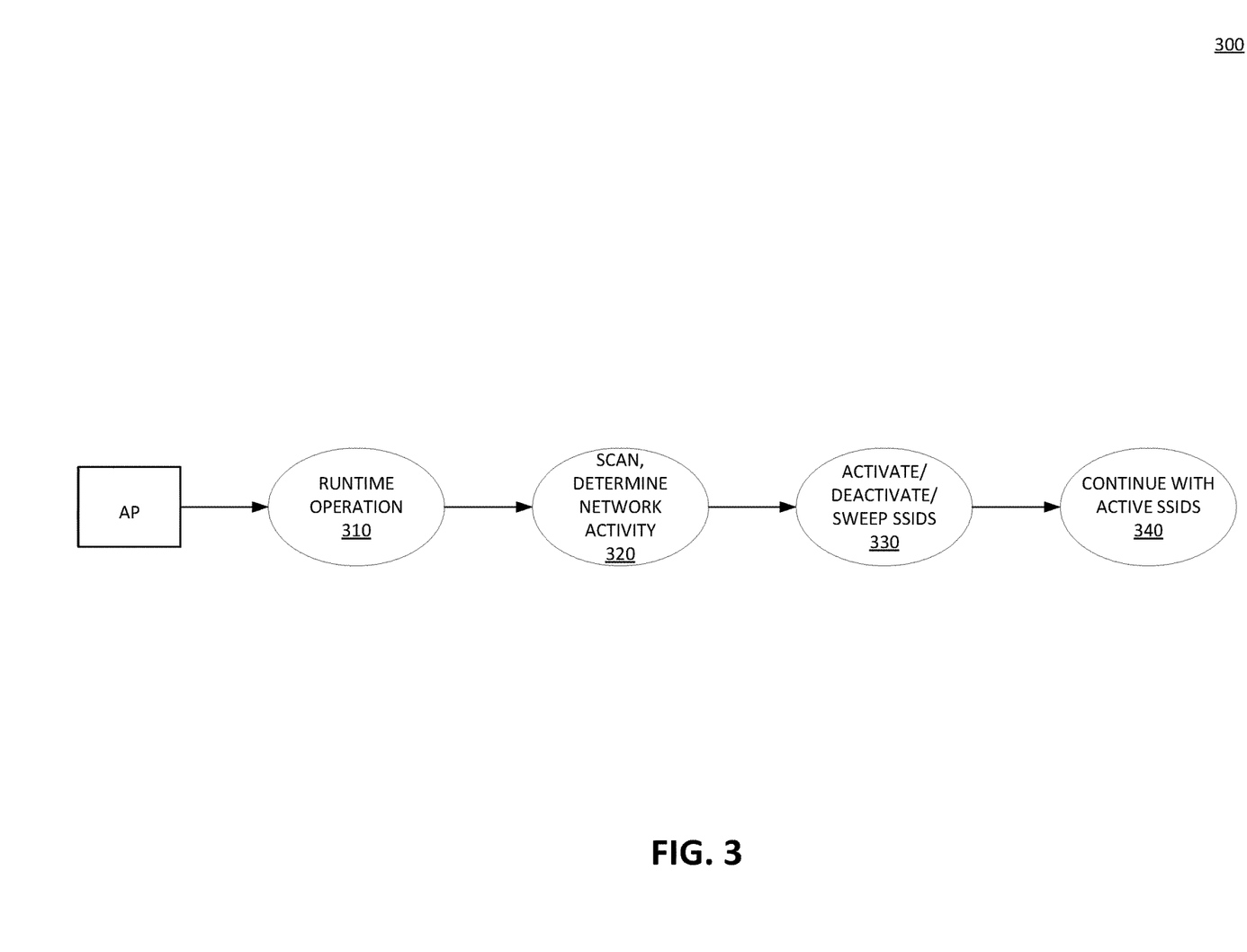
FIG. 3 shows an example method.

FIG. 3 shows an example method 300. The example of FIG. 3 may be applicable to a post-boot procedure that may be performed by, for example, the AP 103 (or gateway 101 if part of the same device) as depicted in FIG. 1. In the example of FIG. 3, an AP, during runtime operations (step 310), may scan for active computing devices probing for an SSID (step 320). As part of the scanning, the AP may determine activity on the various SSIDs and determine whether computing devices are starting to probe a particular SSID. The scanning may comprise off-channel scanning during a configurable interval. The AP may then activate/deactivate SSIDs based on the determined activity (step 330). The AP may then continue runtime operations with the active SSIDs (step 340).

Figure 4:
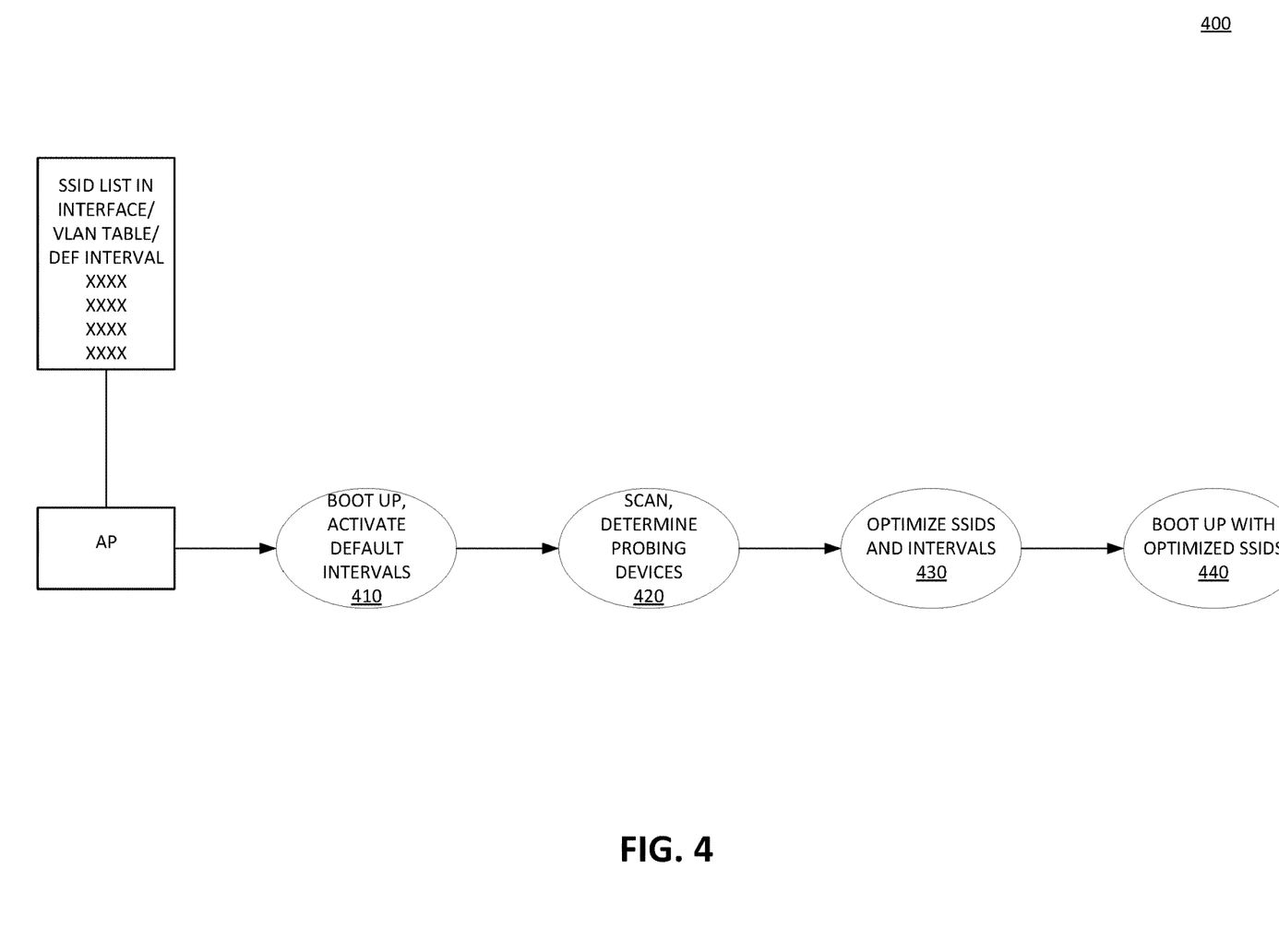
FIG. 4 shows an example method.

FIG. 4 shows an example method 400. The example of FIG. 4 may be applicable to a pre-boot, dynamic beaconing procedure that may be performed by, for example, the AP 103 (or gateway 101 if part of the same device) as depicted in FIG. 1. In the example of FIG. 4, an AP may store information comprising an SSID list. The SSID list may be stored in an interface or VLAN table. The AP may boot up and activate each SSID with a default beacon interval (step 410). The AP may then scan for active computing devices probing for an SSID (step 420). As part of the scanning, the AP may determine a list of probing computing devices and determine network activity. The scanning may comprise off-channel scanning during a configurable interval. The determined network activity may indicate data associated with one or more SSIDs. The data may indicate network congestion associated with an SSID. For example, the network congestion may be associated with a channel utilization rate. In another example, the network congestion may be associated with an indication of a quantity of probe requests associated with an SSID of the one or more SSIDs. The AP may then optimize the SSIDs and their beacon intervals based on the determined activity and the list of probing computing devices (step 430). The optimization may comprise configuration changes. The configuration changes may comprise at least one of: one or more states associated with an SSIDs, one or more beacon intervals associated with an SSIDs, or one or more beacon physical layer data rates associated with an SSIDs. The configuration changes may be based on one or more criteria. The one or more criteria may comprise at least one of: an SSID priority, a type of Wi-Fi network or a Wi-Fi standard. The Wi-Fi standard may be associated with a level of network performance. The AP may then complete the boot up procedure with the optimized SSIDs and beacon intervals (step 440).

Figure 5:
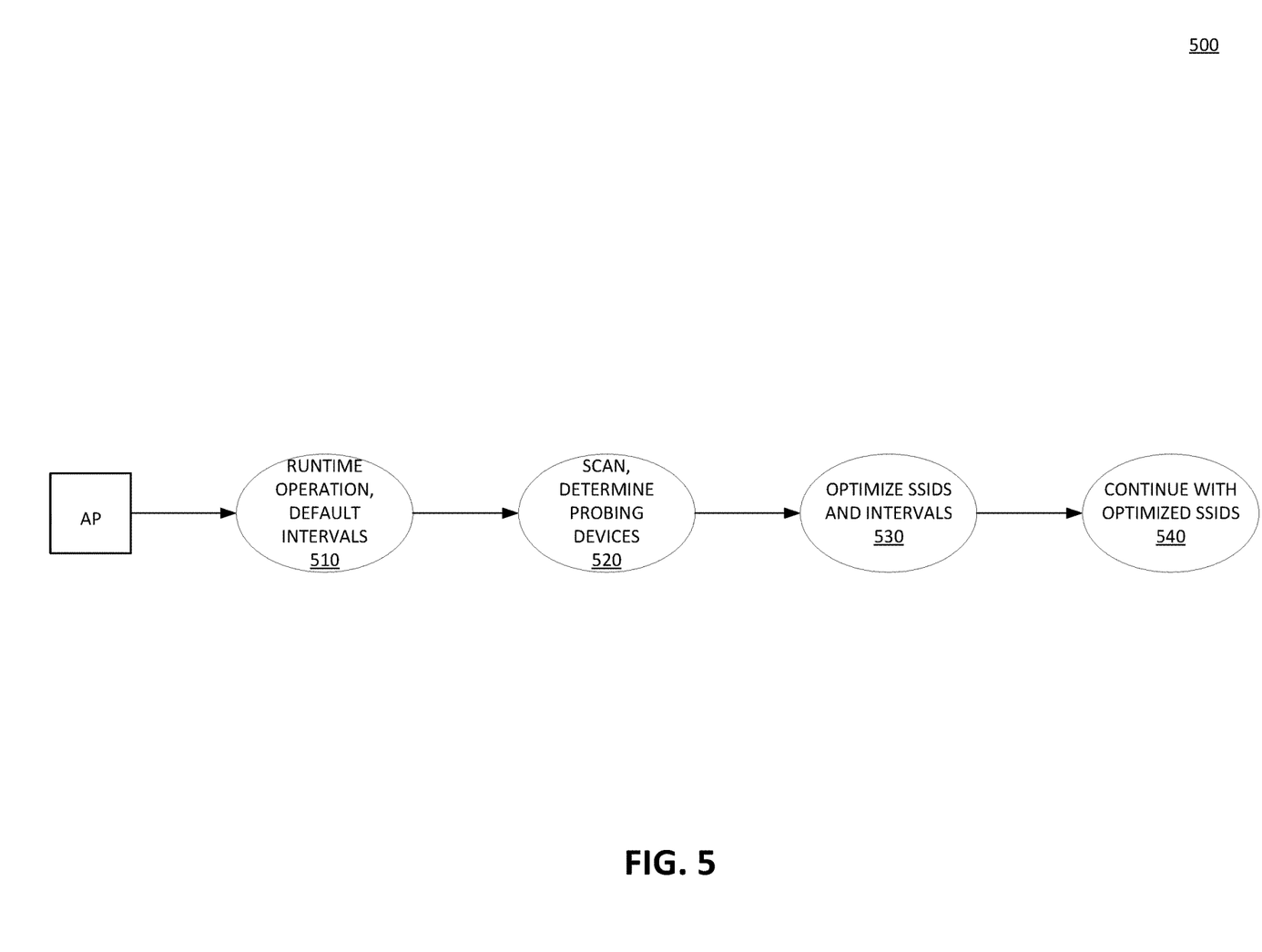
FIG. 5 shows an example method.

FIG. 5 shows an example method 500. The example of FIG. 5 may be applicable to a post-boot, dynamic beaconing procedure that may be performed by, for example, the AP 103 (or gateway 101 if part of the same device) as depicted in FIG. 1. In the example of FIG. 5, an AP, during runtime operations with the activated default intervals (step 510), may scan for active computing devices probing for an SSID (step 520). As part of the scanning, the AP may determine a list of probing computing devices and determine network activity to determine if an SSID needs to be using a default interval or should be adjusted to a higher/lower value. These adjustments may cause improved network availability. The scanning may comprise off-channel scanning during a configurable interval. The determined network activity may indicate data associated with one or more SSIDs. The data may indicate network congestion associated with an SSID. For example, the network congestion may be associated with a channel utilization rate. In another example, the network congestion may be associated with an indication of a quantity of probe requests associated with an SSID of the one or more SSIDs. The AP may then optimize the SSIDs and their beacon intervals based on the determined activity and the list of probing computing devices to allocate beacon intervals based on usage (step 530). The optimization may comprise configuration changes. The configuration changes may comprise at least one of: one or more states associated with an SSIDs, one or more beacon intervals associated with an SSIDs, or one or more beacon physical layer data rates associated with an SSIDs. The configuration changes may be based on one or more criteria. The one or more criteria may comprise at least one of: an SSID priority, a type of Wi-Fi network or a Wi-Fi standard. The Wi-Fi standard may be associated with a level of network performance. The AP may then complete the boot up procedure with the optimized SSIDs and beacon intervals (step 540).

Figure 6:
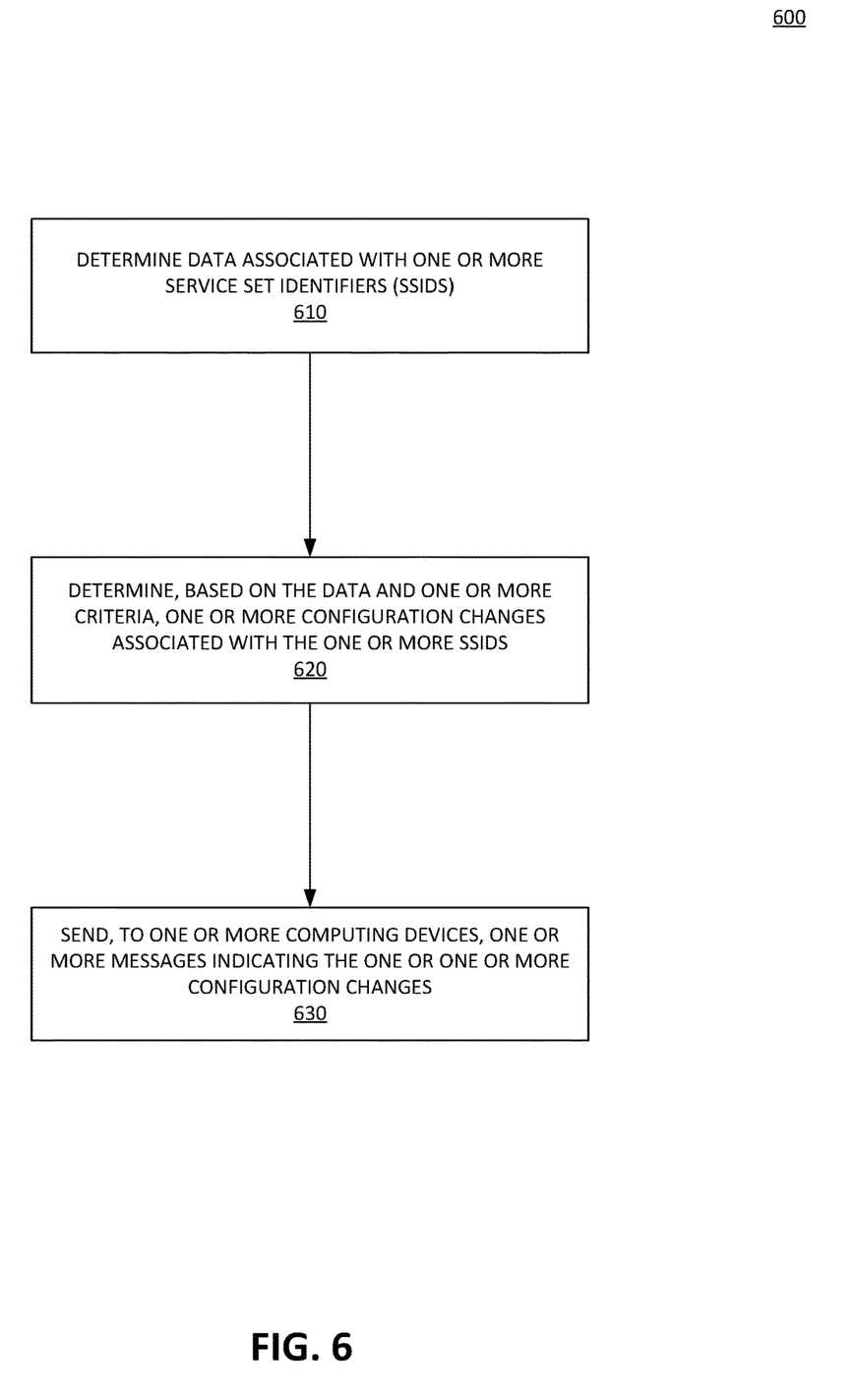
FIG. 6 shows an example method.

FIG. 6 shows an example method 600. The method 600 of FIG. 6, may be performed by any device, for example, by any of the devices depicted in FIGS. 1-5 or described herein. While each step in the method 600 of FIG. 6 is shown and described separately, multiple steps may be executed in a different order than what is shown, in parallel with each other, or concurrently with each other. At step 610, an AP may determine data associated with one or more SSIDs. The data may indicate network congestion associated with the one or more SSIDs. For example, the network congestion may be associated with a channel utilization rate. In another example, the network congestion may be associated with an indication of a quantity of probe requests associated with an SSID of the one or more SSIDs.

At step 620, the AP may determine, based on the data and one or more criteria, one or more configuration changes associated with the one or more SSIDs. The one or more configuration changes associated with the one or more SSIDs may comprise at least one of: one or more states associated with the one or more SSIDs, one or more beacon intervals associated with the one or more SSIDs, or one or more beacon physical layer data rates associated with the one or more SSIDs. The one or more criteria may comprise one or more SSID configuration criteria. The one or more SSID configuration criteria may comprise at least one of: an SSID priority, a type of Wi-Fi network or a Wi-Fi standard. The Wi-Fi standard may be associated with a level of network performance.

If the data indicates high network congestion (e.g., a channel utilization greater than 60%), then the SSID generating the high network congestion may have its beacon interval decreased, its state changed to enabled, or a beacon physical layer data rate decreased to provide greater availability for the SSID generating the high network congestion. If the data indicates low network congestion (e.g., a channel utilization less than 20% or even no utilization), then the SSID associated with the low network congestion may have its beacon interval increased, its state changed to disabled, or a beacon physical layer data rate increased to provide less availability for the SSID generating the low network congestion.

At step 630, the AP may send, to one or more computing devices, one or more messages indicating the one or one or more configuration changes. The one or more messages may comprise a beacon at transmitted at a changed beacon interval, a beacon transmitted at a changed beacon PHY data rate, or an indication that an SSID of one or more SSIDs has been enabled or disabled.

Figure 7:
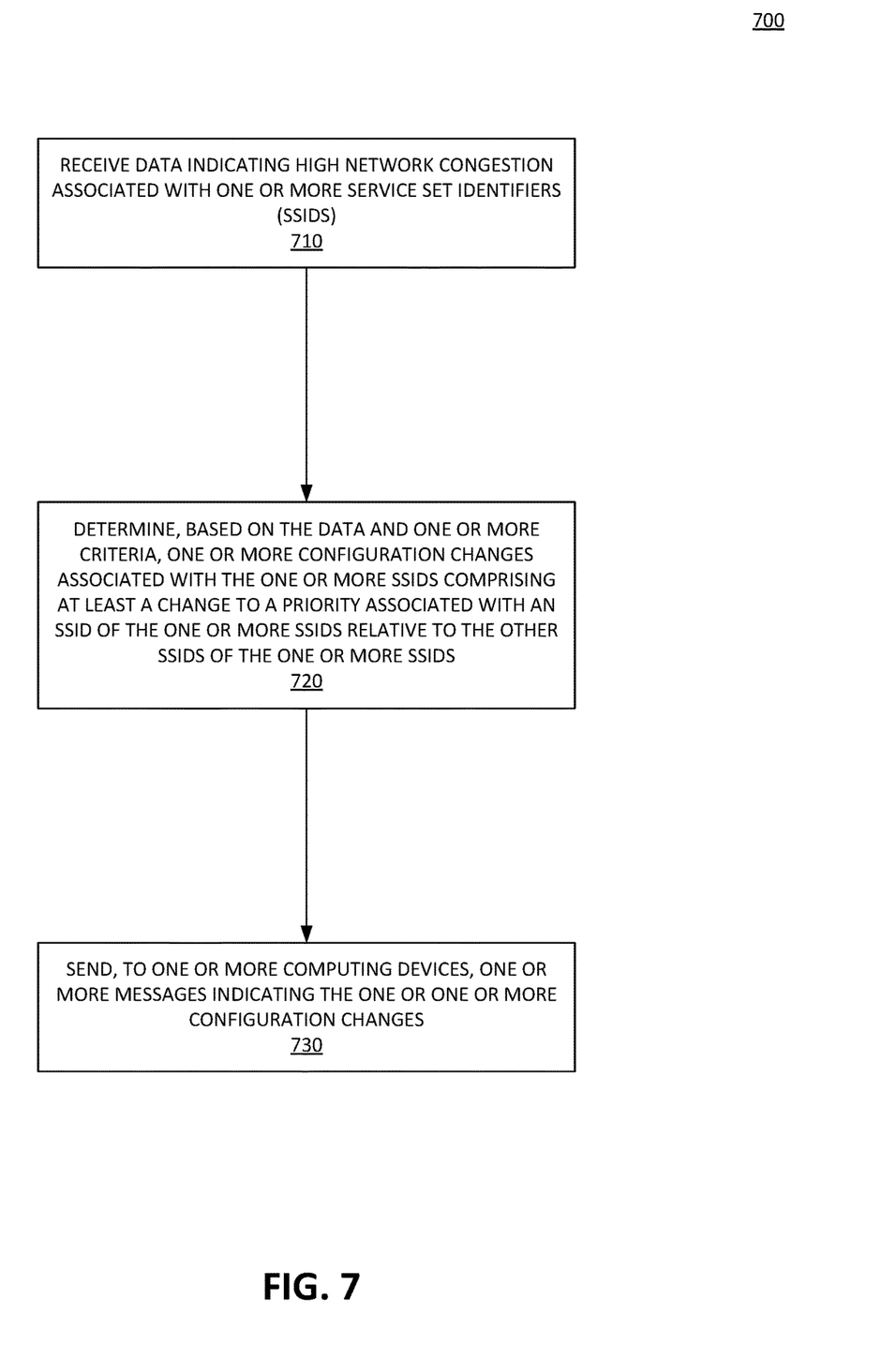
FIG. 7 shows an example method.

FIG. 7 shows an example method 700. The method 700 of FIG. 7, may be performed by any device, for example, by any of the devices depicted in FIGS. 1-5 or described herein. While each step in the method 700 of FIG. 7 is shown and described separately, multiple steps may be executed in a different order than what is shown, in parallel with each other, or concurrently with each other. At step 710, an AP may receive data indicating high network congestion associated with one or more SSIDs. For example, the network congestion may be associated with a channel utilization rate. In another example, the network congestion may be associated with an indication of a quantity of probe requests associated with an SSID of the one or more SSIDs.

At step 720, the AP may determine, based on the data and one or more criteria, one or more configuration changes associated with the one or more SSIDs comprising at least a change to a priority associated with an SSID of the one or more SSIDs relative to the other SSIDs of the one or more SSIDs. The one or more criteria may comprise one or more SSID configuration criteria. The one or more SSID configuration criteria may comprise at least one of: an SSID priority, a type of Wi-Fi network or a Wi-Fi standard. The Wi-Fi standard may be associated with a level of network performance.

If the data indicates high network congestion (e.g., a channel utilization greater than 60%), then the SSID generating the high network congestion may have its priority increased based on having its beacon interval decreased, its state changed to enabled, or a beacon physical layer data rate decreased to provide greater availability for the SSID generating the high network congestion. If the data indicates low network congestion (e.g., a channel utilization less than 20% or even no utilization), then the SSID associated with the low network congestion may have its priority decreased based on having its beacon interval increased, its state changed to disabled, or a beacon physical layer data rate increased to provide less availability for the SSID generating the low network congestion.

At step 730, the AP may send, to one or more computing devices, one or more messages indicating the one or one or more configuration changes. The one or more messages may comprise a beacon at transmitted at a changed beacon interval, a beacon transmitted at a changed beacon PHY data rate, or an indication that an SSID of one or more SSIDs has been enabled or disabled.

Figure 8:
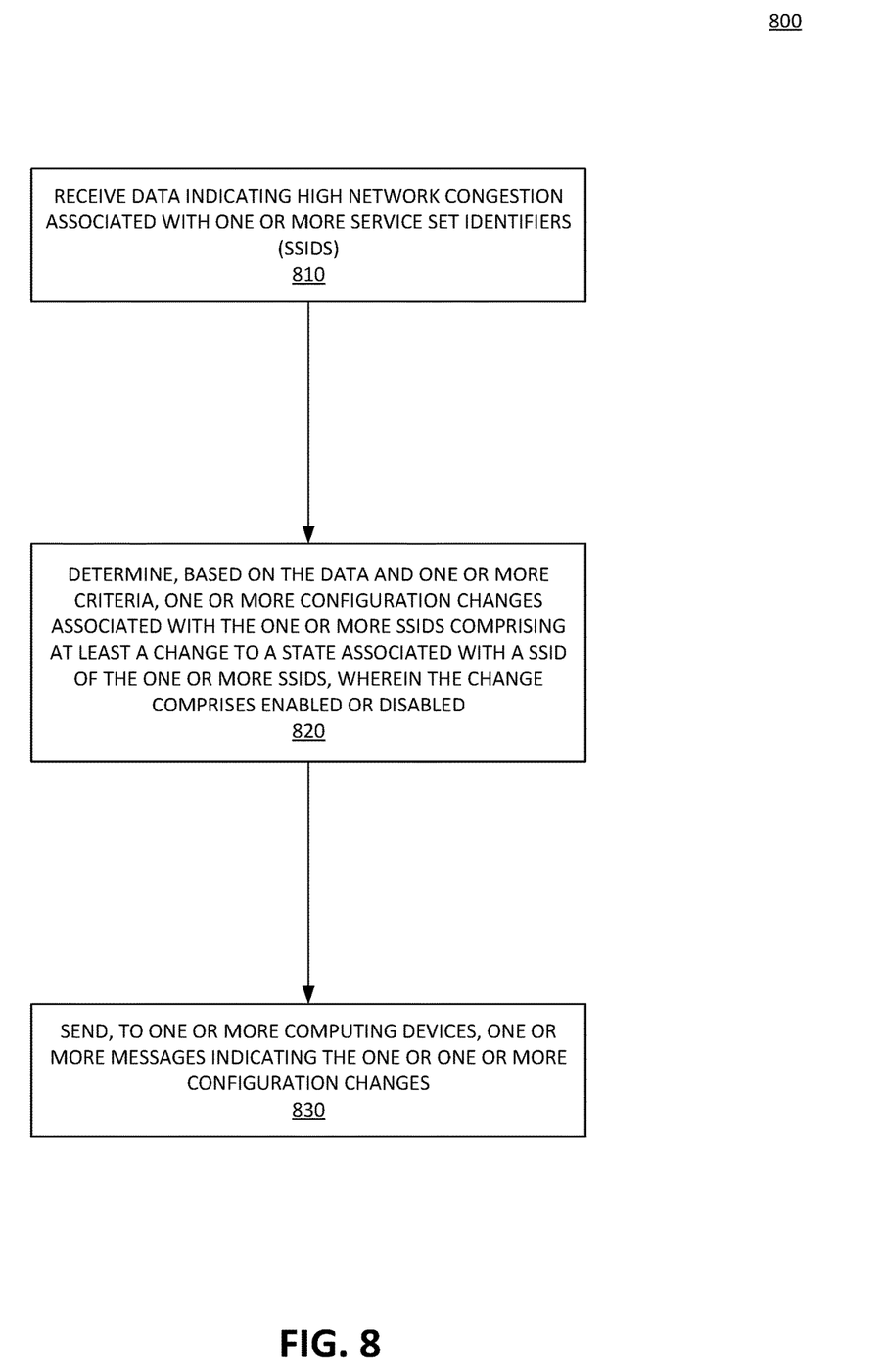
FIG. 8 shows an example method.

FIG. 8 shows an example method 800. The method 800 of FIG. 8, may be performed by any device, for example, by any of the devices depicted in FIGS. 1-5 or described herein. While each step in the method 800 of FIG. 8 is shown and described separately, multiple steps may be executed in a different order than what is shown, in parallel with each other, or concurrently with each other. At step 810, an AP may receive data indicating high network congestion associated with one or more SSIDs. The data may indicate network congestion associated with the one or more SSIDs. For example, the network congestion may be associated with a channel utilization rate. In another example, the network congestion may be associated with an indication of a quantity of probe requests associated with an SSID of the one or more SSIDs.

At step 820, the AP may determine, based on the data and one or more criteria, one or more configuration changes associated with the one or more SSIDs comprising at least a change to a state associated with an SSID of the one or more SSIDs, wherein the change comprises enabled or disabled. If the data indicates high network congestion (e.g., a channel utilization greater than 60%), then the SSID generating the high network congestion may have its state changed to enabled to provide greater availability for the SSID generating the high network congestion. If the data indicates low network congestion (e.g., a channel utilization less than 20% or even no utilization), then the SSID associated with the low network congestion may have its state changed to disabled to provide less availability for the SSID generating the low network congestion. The one or more criteria may comprise one or more SSID configuration criteria. The one or more SSID configuration criteria may comprise at least one of: an SSID priority, a type of Wi-Fi network or a Wi-Fi standard. The Wi-Fi standard may be associated with a level of network performance.

At step 830, the AP may send, to one or more computing devices, one or more messages indicating the one or one or more configuration changes. The one or more messages may comprise a beacon at transmitted at a changed beacon interval, a beacon transmitted at a changed beacon PHY data rate, or an indication that an SSID of one or more SSIDs has been enabled or disabled.

Figure 9:
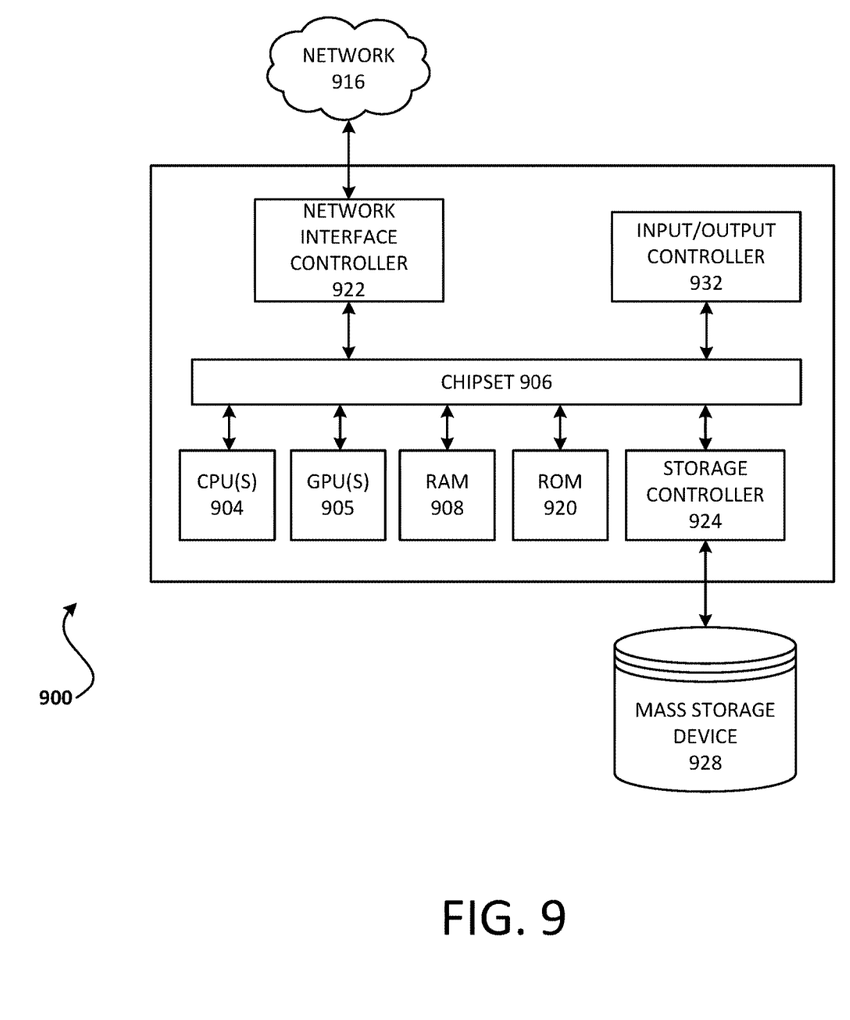
FIG. 9 shows an example computing device.

FIG. 9 depicts a computing device that may be used in various aspects, such as the servers, modules, and/or devices depicted in FIGS. 1-5. With regard to the example architecture of FIGS. 1-5, each device depicted in FIGS. 1-5 may be implemented in an instance of a computing device 900 of FIG. 9. The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-8.

The computing device 900 may comprise a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored.

The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the mass storage device 928 by detecting the physical states or characteristics of one or more particular locations within the physical storage units.

In addition to the mass storage device 928 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described herein. The computing device 900 may have access to computer-readable storage media storing computer-executable instructions, which, when executed by the computing device 900, may perform the methods described in relation to FIGS. 1-8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
 determining a quantity of requests, associated with a service set identifiers (SSIDs) of one or more SSIDs, received by one or more access points (APs) from one or more user devices, wherein the quantity is indicative of network congestion associated with the SSID;

determining, based on the quantity being indicative of network congestion and one or more SSID configuration criteria, one or more configuration changes associated with the one or more SSIDs; and sending, to one or more computing devices, one or more messages indicating the one or more configuration changes.

2. The method of claim 1, wherein the one or more configuration changes comprises at least one of:
one or more states associated with the one or more SSIDs,
one or more beacon intervals associated with the one or more SSIDs, or
one or more beacon physical layer data rates associated with the one or more SSIDs.

3. The method of claim 1, wherein the network congestion is associated with a channel utilization rate associated with an SSID.

4. The method of claim 1, wherein the one or more SSID configuration criteria comprise at least one of: an SSID priority, a type of Wi-Fi network, or a Wi-Fi standard; wherein the Wi-Fi standard is associated with a level of network performance.

5. The method of claim 1, wherein if the network congestion indicates high network congestion associated with the SSID, the one or more configuration changes comprises at least one of:
an increase to a priority associated with a second SSID of the one or more SSIDs relative to the SSID, or
a decrease to a beacon interval of the one or more beacon intervals associated with the second SSID.

6. The method of claim 1, wherein if the network congestion indicates low network congestion associated with a first SSID of the one or more SSIDs, the one or more configuration changes comprises at least one of:
a decrease to a priority associated with a second SSID of the one or more SSIDs relative to the SSID, or
an increase to a beacon interval of the one or more beacon intervals associated with the second SSID.

7. The method of claim 1, wherein if the network congestion indicates a low channel utilization rate associated with an SSID, the one or more configuration changes comprises:
an increase to a beacon interval of the one or more beacon intervals associated with the SSID,
disabling the SSID, or
an increase to a beacon physical layer data rate of the one or more beacon physical layer data rates associated with the SSID.

8. The method of claim 1, wherein if the network congestion indicates a high channel utilization rate associated with the SSID, the one or more configuration changes comprises:
a decrease to a beacon interval of the one or more beacon intervals associated with the SSID, or
a decrease to a beacon physical layer data rate of the one or more beacon physical layer data rates associated with the SSID.

9. The method of claim 1, further comprising:
receiving, from the one or more computing devices, one or more messages comprising the quantity.

10. A method comprising:
receiving one or more messages indicating a quantity of requests, associated with a service set identifier (SSID) of one or more SSIDs, received by one or more access points (APs) from one or more user devices, wherein the quantity is indicative of high network congestion associated with the SSID;

determining, based on the quantity being indicative of high network congestion and one or more SSID configuration criteria, one or more configuration changes associated with the one or more SSIDs, wherein the one or more configuration changes comprises a priority change associated with an SSID relative to the other SSIDs of the one or more SSIDs; and sending, to one or more computing devices, one or more messages indicating the one or more configuration changes.

11. The method of claim 10, wherein the high network congestion is associated with a high channel utilization rate associated with the SSID.

12. The method of claim 10, wherein the priority change is associated with at least one of:
an increase to a priority associated with at least one of the other SSIDs, or
a decrease to a beacon interval of the one or more beacon intervals associated with at least one of the other SSIDs.

13. The method of claim 10, wherein the one or more SSID configuration criteria comprise at least one of: an SSID priority, a type of Wi-Fi network or a Wi-Fi standard; wherein the Wi-Fi standard is associated with a level of network performance.

14. The method of claim 10, wherein if the high network congestion indicates a high channel utilization rate associated with the SSID, the one or more configuration changes further comprise:
a decrease to a beacon interval of the one or more beacon intervals associated with the SSID, or
a decrease to a beacon physical layer data rate of the one or more beacon physical layer data rates associated with the SSID.

15. The method of claim 10, wherein receiving the one or more messages comprises:
receiving, from the one or more computing devices, the one or more messages.

16. A method comprising:
receiving one or more messages indicating a quantity of requests, associated with a service set identifier (SSID) of one or more SSIDs, received by one or more access points (APs) from one or more user devices, wherein the quantity is indicative of high network congestion associated with the SSID;

determining, based on the quantity being indicative of high network congestion and one or more SSID configuration criteria, one or more configuration changes associated with the one or more SSIDs comprising at least a change to a state associated with the SSID, wherein the change comprises enabled or disabled; and sending, to one or more computing devices, one or more messages indicating the one or more configuration changes.

17. The method of claim 16, wherein the high network congestion is associated with a high channel utilization rate associated with the SSID.

18. The method of claim 16, wherein the one or more SSID configuration criteria comprise at least one of: an SSID priority, a type of Wi-Fi network or a Wi-Fi standard; wherein the Wi-Fi standard is associated with a level of network performance.

19. The method of claim 16, wherein if the high network congestion indicates a high channel utilization rate associated with the SSID, the one or more configuration changes further comprise:
- a decrease to a beacon interval of the one or more beacon intervals associated with the SSID, or
- a decrease to a beacon physical layer data rate of the one or more beacon physical layer data rates associated with the SSID.

20. The method of claim 16, wherein receiving the one or more messages comprises:
- receiving, from the one or more computing devices, the one or more messages.

* * * * *